United States Patent
Pingel et al.

(10) Patent No.: US 8,322,203 B2
(45) Date of Patent: Dec. 4, 2012

(54) METHOD FOR THE AUTOMATIC IDENTIFICATION OF A TYPE OF VEHICLE ON A TEST STAND

(75) Inventors: Ulrich Pingel, Marl (DE); Ralf Viehl, Marl (DE)

(73) Assignee: Ventech GmbH, Marl (DE)

( * ) Notice: Subject to any disclaimer, the term of this patent is extended or adjusted under 35 U.S.C. 154(b) by 657 days.

(21) Appl. No.: 12/311,058

(22) PCT Filed: Sep. 12, 2007

(86) PCT No.: PCT/DE2007/001624
§ 371 (c)(1),
(2), (4) Date: Nov. 17, 2009

(87) PCT Pub. No.: WO2008/034410
PCT Pub. Date: Mar. 27, 2008

(65) Prior Publication Data
US 2010/0058849 A1    Mar. 11, 2010

(30) Foreign Application Priority Data

Sep. 19, 2006 (DE) .......................... 10-2006 044 587

(51) Int. Cl.
*G01M 17/007* (2006.01)
(52) U.S. Cl. .................................................. 73/116.01
(58) Field of Classification Search ............... 73/116.01, 73/116.05, 116.06, 116.07, 116.09
See application file for complete search history.

(56) References Cited

U.S. PATENT DOCUMENTS

| 4,493,103 | A |   | 1/1985  | Yamashita et al. |
|-----------|---|---|---------|------------------|
| 5,260,520 | A |   | 11/1993 | Muhs et al. |
| 5,396,817 | A |   | 3/1995  | Rosensweig |
| 5,445,020 | A |   | 8/1995  | Rosensweig |
| 5,446,291 | A | * | 8/1995  | Becker et al. ............ 250/559.24 |
| 5,574,226 | A | * | 11/1996 | Reuther et al. .................. 73/669 |
| 5,753,810 | A |   | 5/1998  | Bass |
| 5,962,779 | A |   | 10/1999 | Bass |
| 6,894,233 | B2 | * | 5/2005 | Dingwall et al. ......... 177/210 C |
| 6,925,377 | B2 |   | 8/2005 | Peters |
| 7,942,048 | B2 | * | 5/2011 | Pingel et al. ................. 73/146.5 |
| 2010/0058852 | A1 | * | 3/2010 | Pingel et al. ................. 73/146.2 |
| 2010/0204869 | A1 | * | 8/2010 | Hall et al. ....................... 701/29 |

FOREIGN PATENT DOCUMENTS

EP    1 327 872 A2    7/2003

\* cited by examiner

*Primary Examiner* — Eric S McCall
(74) *Attorney, Agent, or Firm* — Marshall & Melhorn, LLC

(57) ABSTRACT

A method for automatically identifying a type of vehicle on a test stand includes: a) supplying predetermined parameters characterizing the type of vehicle; b) providing a test stand encompassing a plurality of sensors; c) sensing at least some areas of a tire on the test stand; and d) determining at least one tire property from values sensed by means of at least some of the sensors. The properties determined in step d) are compared with the predetermined parameters, and the type of vehicle is assigned on that basis, or parameters of a new type of vehicle are defined if the properties fail to match the parameters.

6 Claims, 2 Drawing Sheets

SAMPLE TABLE (EXTRACT)

VEHICLE TYPE - TRAILER 1

| | MIN | MAX |
|---|---|---|
| NO. OF AXLES | 5 | 5 |
| TRACK WIDTH, AXLE 1 | 2250 | 2300 |
| TIRE WIDTH, AXLE 1 | 360 | 400 |
| TIRE LOAD, AXLE 1 | 1600 kg | 3500 kg |
| DISTANCE BETWEEN AXLES 1 AND 2 | 2400 mm | 3500 mm |
| TRACK WIDTH, AXLE 2 | 2050 | 2100 |
| TIRE WIDTH, AXLE 2 | 600 | 640 |
| TIRE LOAD, AXLE 2 | 3500 kg | 6500 kg |
| DISTANCE BETWEEN AXLES 2 AND 3 | 4800 | 6500 |
| TRACK WIDTH, AXLE 3 | 2200 | 2450 |
| TIRE WIDTH, AXLE 3 | 360 | 400 |

FIG. 2

METHOD FOR THE AUTOMATIC IDENTIFICATION OF A TYPE OF VEHICLE ON A TEST STAND

BACKGROUND OF THE INVENTION

This invention relates to a method for the automatic identification of a type of vehicle on a test stand. In this context, "type of vehicle" thereby also means the body of a vehicle, or a car body type for short.

The ability to specify nominal values and tolerances is an important requirement for the automatic servicing of a vehicle. These parameters include, for example, the specified tire pressure and the allowable tolerance. Automatic test stands such as those for tire pressure, for example, are described in U.S. Pat. No. 5,396,817 or U.S. Pat. No. 5,445,020.

EP 1 327 872 A2 describes an apparatus for the determination of the internal pressure of a tire, in particular of vehicle tires, whereby this apparatus has a measurement unit, an electronic evaluation system and an optical-acoustic display unit. The invention teaches that the measurement unit is located on each vehicle track and has electro-mechanical means with a downstream signal converter. The internal tire pressure is thereby determined on the basis of the tire contact area by means of mathematical formulas, technical data on tire types and empirical values of physical characteristics, whereby these values are processed in a host computer. Using the formulas stored in the host computer, the tire contact area is calculated by means of the tire width and rolling surface and is then plotted graphically. The result is reliable information on the current internal tire pressure, although the information obtained is not the result of a precise and accurate measurement but only information that is sufficient to inform the vehicle driver of any overpressure, underpressure or normal pressure in the vehicle tires.

The object of the invention is therefore to make available a method for the automatic identification of a type of vehicle on a test stand so that the default settings for nominal values and tolerances can be made automatically.

SUMMARY OF THE INVENTION

The method of the invention for the automatic identification of a type of vehicle on a test stand has the following steps:
a) Delivery of predetermined parameters that characterize the type of vehicle;
b) Delivery of a test stand which has a plurality of sensors;
c) Sensing of at least areas of a tire on the test stand;
d) Determination of at least one characteristic of the tire from values, at least some of which have been sensed by the sensors;
e) Comparison of the characteristics determined in Step d) with the predetermined parameters;
f) Classification of the type of vehicle on the basis of the result from Step e) or, if a classification is not possible on account of a lack of coherence of characteristics with the parameters, definition of parameters or a new vehicle model.

The characteristics to be determined can be, for example, the tire width and the tire tread, from which the type of tire can be identified. The type of vehicle can also be determined from the track width of each axle, the distance between axles, the axle load and the total weight of the vehicle. Characteristics to be determined can also include the rigidity values of the tire, which are the result of the strength of the sides of the tire, and the transverse forces (contact area effects), as well as tire pressure, tire load, load distribution over the axles etc.

Once the classification has been made, the nominal values and tolerances, which can be stored in a database for example, can be assigned to the variable operating values.

It is also advantageous if a verification is made whether a sensed or measured value lies within a specified range of nominal values or tolerance for the type of vehicle or the type of tire, and if the value lies outside the range of nominal values or tolerance an action is taken that brings the value into the range of nominal values or tolerance. A simple indication of the result of the verification is possible, e.g. yes/no, so that the decision on any action to be taken can be left to the user.

It is advantageous if each parameter is assigned a weighting which is taken into consideration in Step f) of the classification of the type of vehicle or type of tire.

It is also appropriate if an acceptance range is associated with each parameter, whereby the acceptance range is adapted for the parameters of each type of vehicle so that the classification in Step f) is clear and unambiguous.

The last two measures are particularly important if the method is required to "learn" or define a new type of vehicle. In this case, a still unknown type of vehicle is driven over the measurement instrument. The vehicle type data determined are then associated with the vehicle being newly tested. For this purpose, recurring verifications must be made whether a clear and unambiguous distinction between all types of vehicles can be made on the basis of the detailed data determined or whether collisions can occur. In the latter case, appropriate measures such as the reduction of the acceptance ranges or the introduction of new parameters must be considered.

BRIEF DESCRIPTION OF THE DRAWINGS

The invention is described in greater detail below with reference to the accompanying drawings, in which:

FIG. 2 which is in the form of a table, presents an example for the acceptance widths of parameters for a trailer 1 vehicle type.

DETAILED DESCRIPTION OF THE INVENTION

Figure 1:
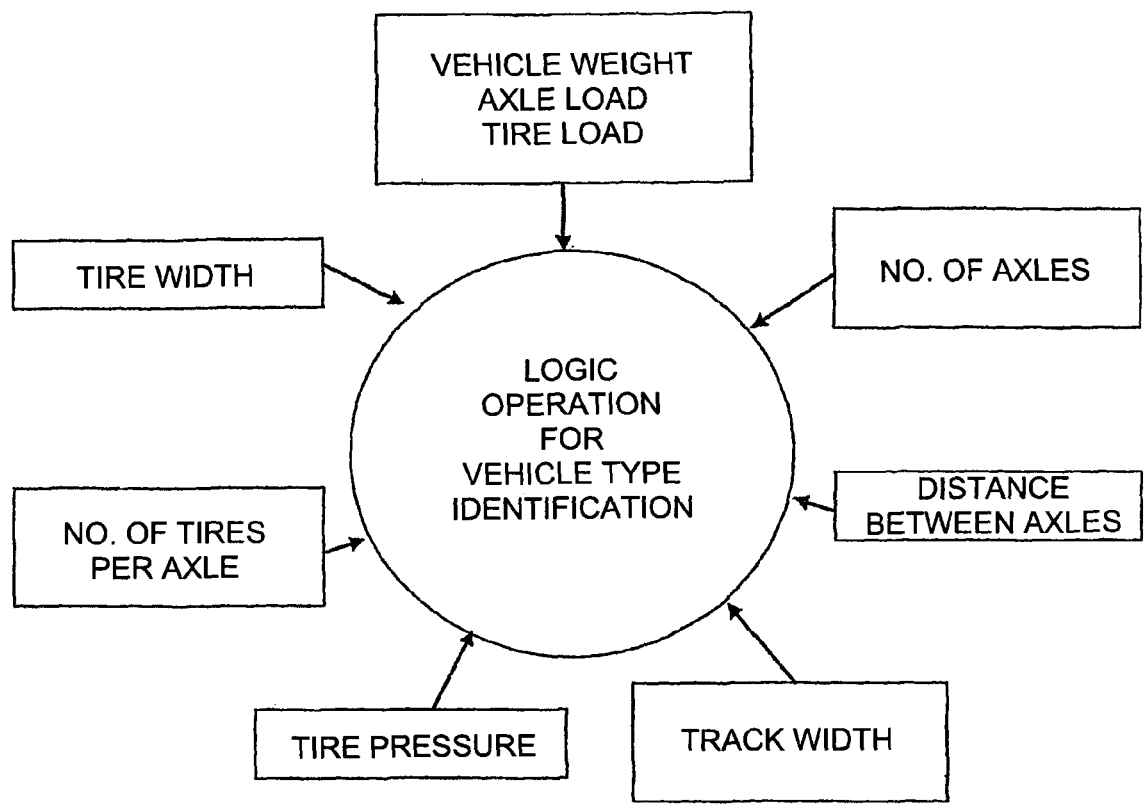
FIG. 1 is a schematic illustration of possible parameters that can be included in the identification of the type of vehicle.

FIG. 1 shows the parameters that can be included in the vehicle type identification. These parameters include the number of axles as well as the number of tires per axle, the track width on each axle, the distances between axles, the weight of the vehicle, the axle load, the tire load and the tire width. The values for the characteristics measured are logically joined for the identification of the vehicle. The characteristics can be weighted and their weighting can be varied. For example, an intelligent network can be used, such as a neuronal network, for example, or a network based on fuzzy logic, to identify the type of vehicle.

FIG. 2 shows in table form the acceptance ranges which are stored for important parameters of a vehicle type which is described by way of example.

The characteristics of the invention disclosed in the above description, in the accompanying drawing and in the claims can be considered essential for the realization of the invention both individually as well as in any desired combination.

The invention claimed is:

1. A method for the automatic identification of a type of vehicle on a test stand, comprising the steps:
a) providing predetermined parameters that characterize the type of vehicle;

b) providing a test stand which has a plurality of sensors;
c) sensing of at least areas of a tire on the test stand;
d) determining at least one characteristic of the vehicle or of the tire from values, at least some of which have been sensed by the sensors;
e) comparing the characteristics determined in Step d) with the predetermined parameters; and
f) classifying the type of vehicle on the basis of the result from Step e) or, if it is not possible to classify the type of vehicle on account of a lack of coherence of characteristics with the parameters, defining parameters for a new vehicle model.

2. The method according to claim 1, wherein at least one of the characteristics is sensed or determined from sensed values and is selected from the group consisting of tire width, tire tread, rigidity of the tire, tire pressure, tire load, number of tires per axle, track width of at least one axle of the vehicle, the distances between the individual axles, current axle load, load distribution over the axles and the total weight of the vehicle.

3. The method according to claim 1, wherein the type of vehicle is associated with nominal values and/or tolerances for the parameters of the vehicle.

4. The method according to claim 1, wherein a verification is performed to determine whether a sensed or measured value lies within a specified range of nominal values or tolerance, and if the value lies outside the range of nominal values or tolerance, an action is carried out which brings the value into the range of nominal values or tolerance.

5. The method according to claim 1, wherein a weighting is assigned to each of the predetermined parameters, and the classifying of the type of vehicle performed in step f) is based on the predetermined parameters with assigned weightings.

6. The method according to claim 1, wherein an acceptance range is associated with each parameter, whereby the acceptance ranges for the parameters of each type of vehicle are adjusted so that the classification in Step f) is clear and unambiguous.

* * * * *